Oct. 1, 1968   T. A. McCANN   3,403,415
SHOEMAKING APPARATUS
Filed July 22, 1965   3 Sheets-Sheet 1
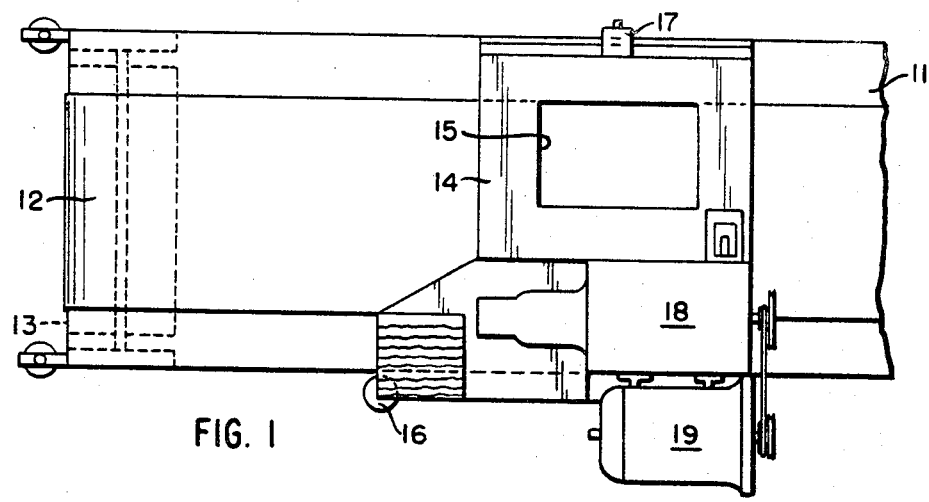
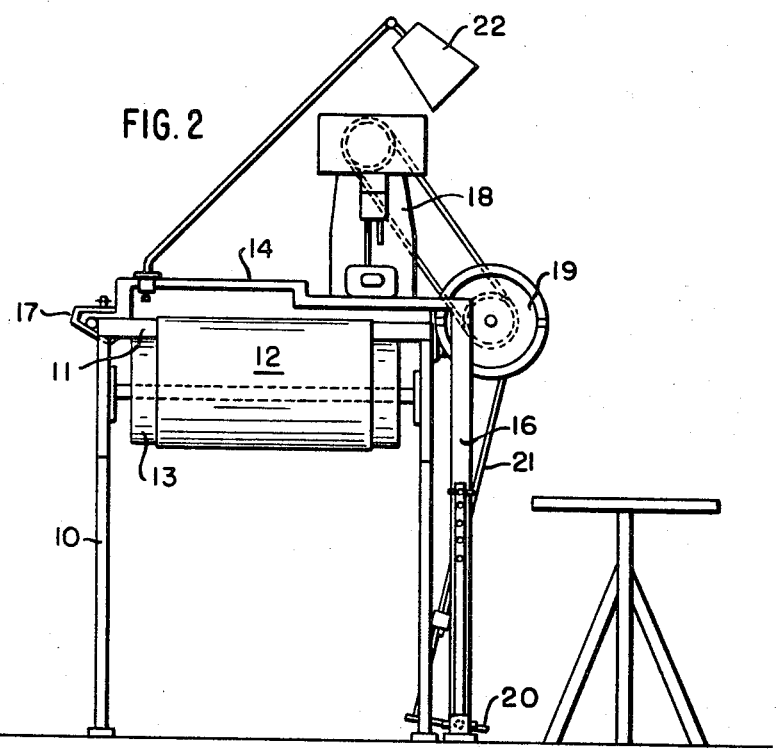
INVENTOR.
THOMAS A. McCANN
BY
ATTORNEYS Oct. 1, 1968 T. A. McCANN 3,403,415
SHOEMAKING APPARATUS
Filed July 22, 1965 3 Sheets-Sheet 2

INVENTOR.
THOMAS A. McCANN
BY
ATTORNEYS

United States Patent Office 3,403,415
Patented Oct. 1, 1968

3,403,415
SHOEMAKING APPARATUS
Thomas A. McCann, Via di Scorcola 15, Trieste, Italy
Filed July 22, 1965, Ser. No. 473,986
Claims priority, application Italy, Apr. 10, 1965,
3,396/65, Patent 775,210
2 Claims. (Cl. 12—1)

ABSTRACT OF THE DISCLOSURE

Shoemaking apparatus including a conveyor-carrying bench, in combination with a detachable station having a front work table section and a rear elevated table section having a work passing aperture opening above the conveyor.

---

This invention comprises new and improved apparatus for the fabrication of footwear or the like and is herein shown in its application to stitching room procedure. Its general object is to supply each operator by conveyor the pieces required for successive operations at a rate most compatible with her skill and to remove the finished work all without the use of transportable boxes or cases.

Heretofore in the footwear industry each machine operator takes a number of pieces on which an operation is to be carried out from a box placed in convenient position and the pieces which have been completed by the operator are put in another box which is every now and then taken away and replaced by an empty one.

This system of treatment and transportation of pieces causes loss of time in reaching for and selecting each piece from the box and also by holding inactive at one station a substantial number of pieces for each operation, all of which adds up to an appreciable manufacturing cost.

According to the present invention the pieces are supplied one at a time to each operator by a conveyor belt in such a manner as to free the operator of making any distracting movements that result in loss of operating time.

Accordingly in one aspect the invention comprises an elongated bench having a fixed top for supporting and guiding a conveyor belt in combination with a station table having an aperture therein and means for detachably clamping the station table to the bench at any selected position in its length with its aperture opening above the conveyor belt so that at any convenient time the operator may drop a work piece upon the moving belt. A sewing machine or other power driven appliance is mounted upon the station table in convenient position for control by the operator.

Figure 3:
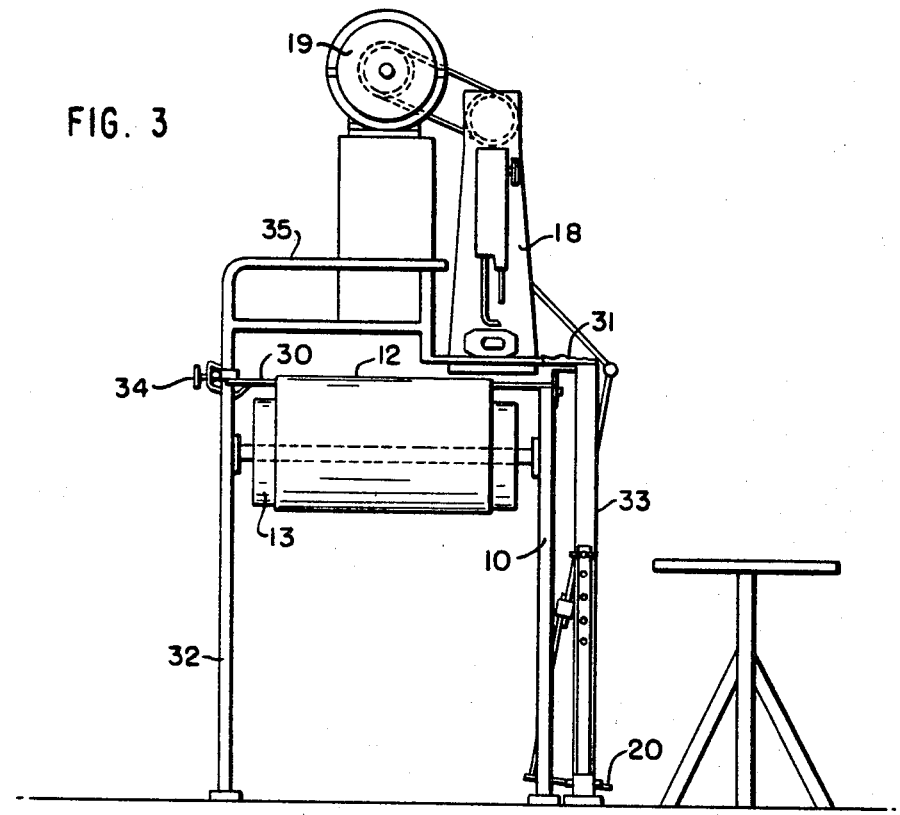
Figure 4:
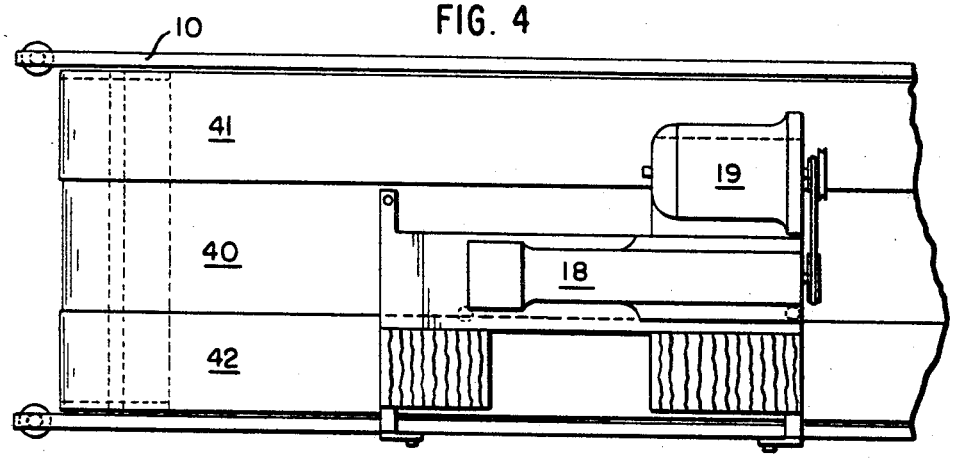
Figure 5:
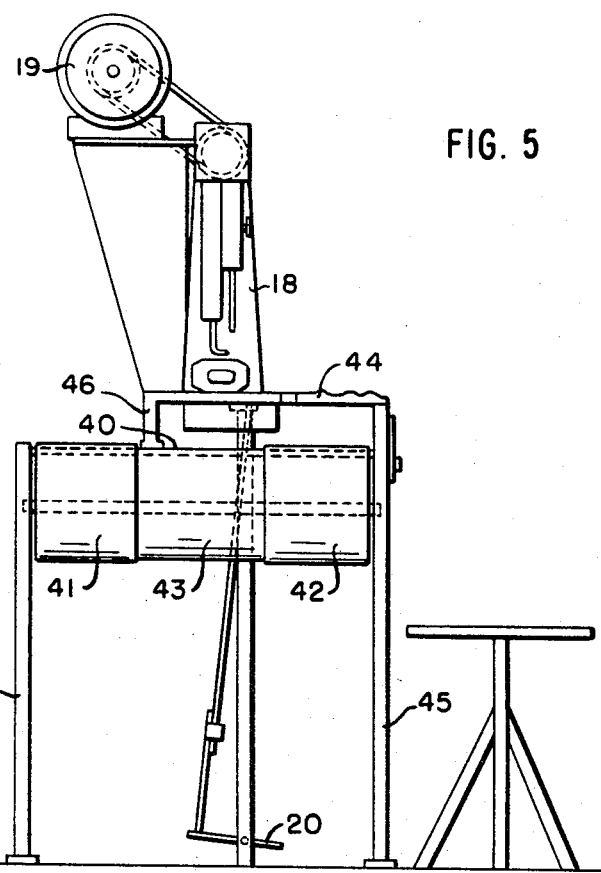

These and other features of the invention will be best understood and appreciated from the following description of preferred embodiments thereof selected for purposes of illustration and shown in the accompanying drawings, in which:

FIG. 1 is a plan view of a portion of the apparatus,
FIG. 2 is a corresponding end view,
FIG. 3 is a similar end view of a modified apparatus,
FIG. 4 is a fragmentary plan view of apparatus equipped with two conveyor belts, and
FIG. 5 is a corresponding end view.

As shown in FIGS. 1 and 2 the apparatus comprises an elongated bench 10 having a flat top 11 arranged to support and guide an endless conveyor belt 12 for travel in a horizontal path. The conveyor belt runs over pulleys 13 at the ends of the bench, one being shown in the drawings. The bench top 11 may be solid as shown in FIG. 2 or constructed of spaced slats so long as it has sufficient area to support the conveyor belt from edge to edge in its longitudinal travel.

With the bench is associated a station table or frame for each individual operator. One of these as shown in FIGS. 1 and 2 has an elevated rear section 14 with a rectangular aperture 15 and is longitudinally shouldered forming a downwardly offset front or work section which is imperforate. This section is supported by a leg 16 adjustable at the convenience of the operator. The rear section is provided with a clamp 17 by which the station table may be fastened to the bench top at the desired location. The elevated rear section of the table is spaced above the conveyor belt to permit free passage of the work pieces beneath it. Upon the front and lower work section of the station table is mounted a sewing machine 18 and this is belted to a motor 19 under the control of a foot pedal 20 through a connecting rod 21. The station table also carries an adjustable lamp 22. While the machine 18 has been referred to as a sewing machine, it will be understood that instead it may be an eyeleting, skiving or cementing machine or any other operator-controlled machine required for a particular system.

The front or work section is imperforate and thus supplies a smooth working surface for the operator while the aperture 15 is located in the rear elevated section where it is guarded from receiving a misplaced work piece.

In FIG. 3 is shown a somewhat modified apparatus in which the bench has a top 30 of sheet metal for supporting the conveyor belt 12 and in which the station table 31 is provided with a rear leg 32 and an adjustable front leg 33 so that it derives its support independently of the bench 10. In this modification the motor 19 is mounted upon the rear section of the station table in belt connection with the sewing machine 18 which, as before, is controlled by the treadle 20. The rear section of the table 31 is apertured as in FIG. 1 and provided with transverse rails 35 for support of the motor. A screw clamp 34 is provided for holding the rear section to the bench.

In FIGS. 4 and 5 is shown a modification of the apparatus in which two parallel conveyor belts 41 and 42 are arranged to run with a space between them across the top 40 of the bench 10. A pulley 43 is shown at one end of the bench. The station table 44 is shown as having an external leg 45 and an internal leg 46 supported by the bench top 40.

The station table is apertured above the conveyor belt 42 as shown in FIG. 4 and the motor 19 and sewing machine 18 are mounted upon the table 44 in an intermediate position.

In each of these modifications the station table or frame can be traversed along the side of the bench facing the operator and of course two similar machines can be located adjacent to each other for operations requiring double or more time for the work than a single machine.

Hand work may be also carried out which does not require the use of a machine. For this work it is possible to utilize the forward sections of the station tables better shown as projecting above the belt 12. The bench may be also fitted with a diaphragm or other deflecting means for automatically removing from the belt the successive work pieces as they arrive.

Certain cementing operations require heat treatment of the work pieces and for such work a heating box may be placed over the belt, the belt itself becoming the base of the box.

From the foregoing description it will be apparent that the number of the work pieces remaining in the system is substantially reduced as compared to the number held in idleness by systems heretofore known. Not only is the time of fabrication reduced, but much dead time is eliminated for each worker and the cost of manufacture reduced in that respect.

Having thus disclosed my invention what I claim as new and desire to secure by Letters Patent is:

1. Apparatus for the fabrication of footwear comprising an elongated bench having a flat top, means for guiding a conveyor belt thereon, a detachable station table having a rear section and a front work section, the rear section having an aperture opening above the conveyor belt and the front section being imperforate and presenting a flat working surface interposed between the said aperture and the operator, said table having front and rear legs, said front legs being adjustable for the convenience of the operator, means for clamping the rear table section to the bench at any selected position in its length, said rear section being spaced above said belt by an amount which permits passing of a shoe between the belt and rear section, and a shoemaking machine under the operator's control mounted in the imperforate work table section of the station.

2. Apparatus as described in claim 1, further characterized in that the front work table section is set off from the elevated rear table section by a longitudinally extending shoulder and so guarded from a misplaced work piece.

References Cited

UNITED STATES PATENTS

| | | | |
|---|---|---|---|
| 1,256,294 | 2/1918 | Campbell | 198—19 |
| 1,730,313 | 10/1929 | Benner | 198—19 |
| 1,780,118 | 10/1930 | D'Humy | 198—19 |
| 2,108,869 | 2/1938 | Sandmeyer | 198—19 X |
| 3,191,558 | 6/1965 | Graves | 112—2 |
| 2,264,032 | 11/1941 | Webb. | |
| 2,512,574 | 6/1950 | Carson | 12—1 |
| 2,848,960 | 8/1958 | Cetrulo | 112—2 |
| 2,901,082 | 8/1959 | Baumann | 198—19 |
| 3,159,122 | 12/1964 | Hedegaard. | |

OTHER REFERENCES

"DAS ABC der Schuh-Fabikation," No. 13, published June 28, 1935.

HERBERT F. ROSS, *Primary Examiner.*